United States Patent Office 3,285,814
Patented Nov. 15, 1966

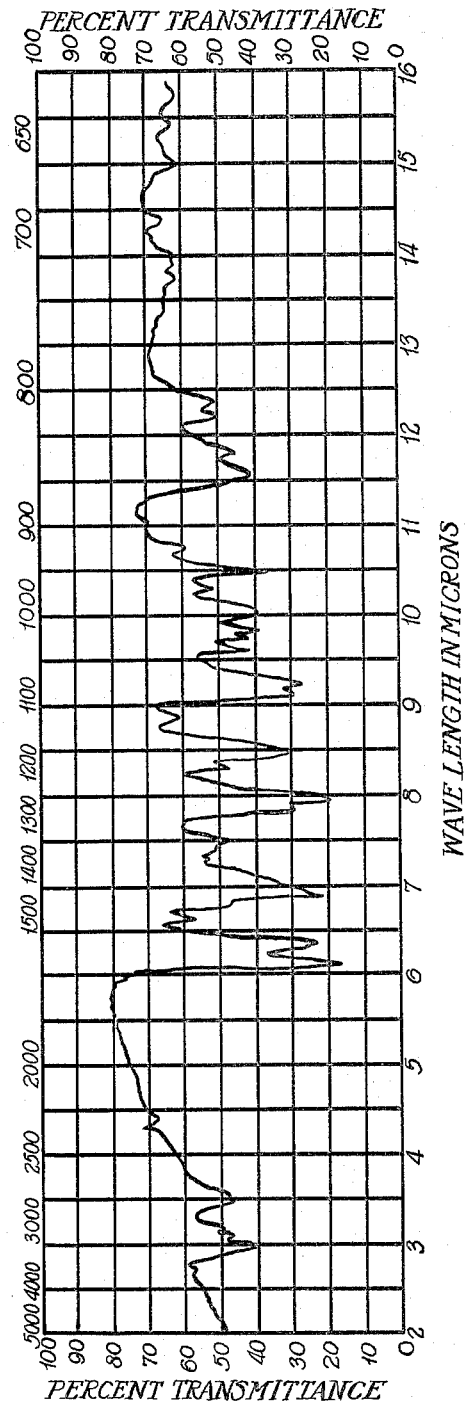

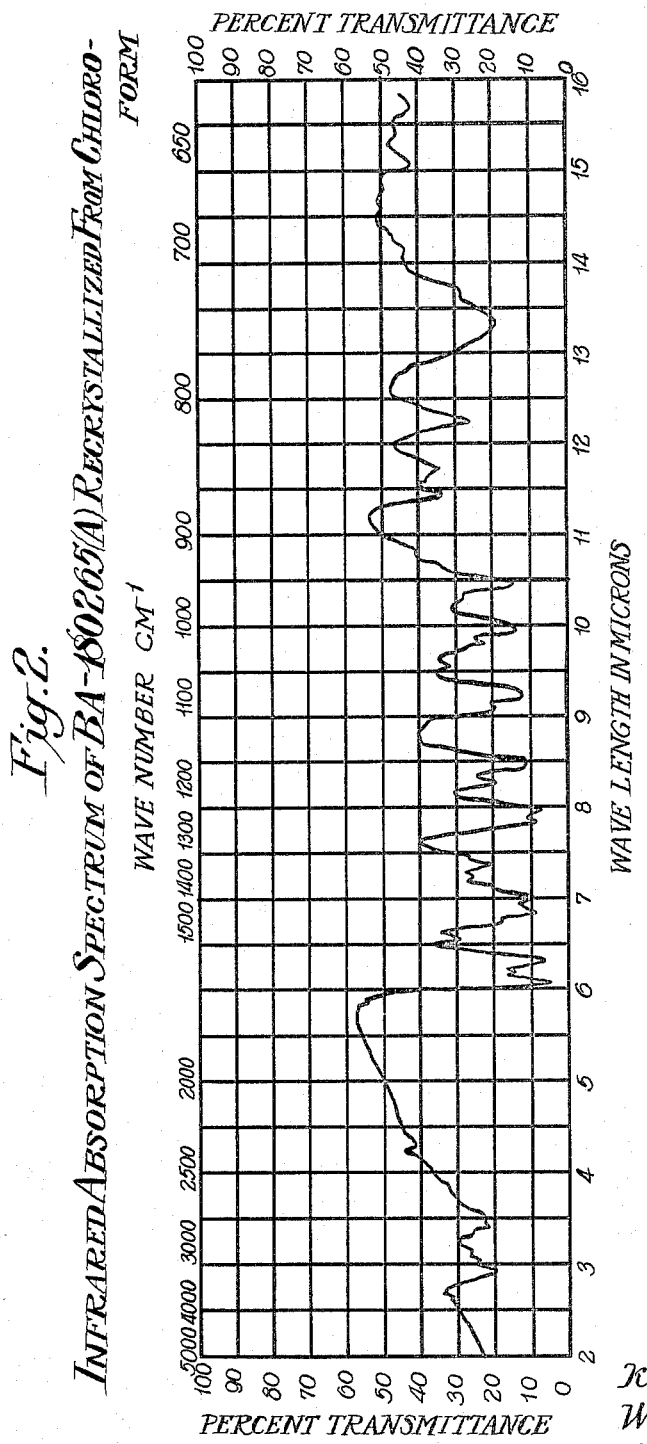

3,285,814
ANTIBIOTIC COMPLEX BA–180265(AB) AND
PROCESS FOR MAKING SAME
Koppaka V. Rao, Pine Brook, William S. Marsh, Wanaque, and Wen-Chih Liu, Maywood, N.J., assignors to Chas. Pfizer & Co., Inc., New York, N.Y., a corporation of Delaware
Filed Apr. 7, 1964, Ser. No. 359,544
7 Claims. (Cl. 167—65)

This application is a continuation-in-part of our earlier application Serial No. 176,308, filed February 28, 1962, now abandoned.

This invention relates to the cultivation under controlled conditions of a strain of Streptomyces sp. (ATCC No. 14571), to the biologically active complex produced thereby, to methods for the recovery and concentration from crude solutions, including fermentation broths, of this new and useful complex which is designated antibiotic complex BA–180265(AB) and to methods for the separation of said complex into two biologically-active, crystalline principles, designated BA–180265(A) and BA–180265(B).

This invention relates specifically to the antibiotic complex BA–180265(AB) and to the two biologically-active crystalline components isolated therefrom, in both their crude and purified forms, and to methods for the preparation, isolation and separation of these substances from one another. The antibiotic complex and the two active principles, one relatively non-polar BA–180265(A) and the other relatively polar BA–180265(B), isolated therefrom, all possess useful antimicrobiological activity against a variety of organisms. This permits their application in agriculture. The new antibiotic complex and principles are of use in industrial fermentations to prevent contamination by sensitive organisms. They have activity in medical diagnostic techniques and, in addition, are useful in separating and classifying organisms. In addition, the antibiotic complex, and each of the two active principle isolates, show activity against human carcinoma cells. Utility in cancer therapy has not as yet been demonstrated.

The organism which is employed in the valuable process of the present invention was isolated from a soil sample. It was identified by Dr. J. B. Routien as a member of the genus Streptomyces. For complete classification it was planted in replicates of 6 on media normally used for identification of such microorganisms and incubated at the proper temperature for 14 days. Readings of the media were made at appropriate times and final records were made after two weeks of incubation in the accepted fashion. A culture of this strain has been deposited with the American Type Culture Collection and given the number ATCC 14571.

The description of this microorganism, designated isolate BA–180265 in the culture collection of Chas. Pfizer & Co., Inc. of Brooklyn, New York, was supplied by Dr. J. B. Routien. The cultural characteristics of the microorganism are set forth in Table I:

TABLE I.—CULTURAL CHARACTERISTICS OF ISOLATE BA-180265

| Medium | Amount of Growth | Aerial Mycelium and Sporulation | Soluble Pigment | Remarks |
|---|---|---|---|---|
| Glucose-Asparagine Agar | Poor | Scant; whitish gray; no spores. | Yellow-green but becoming yellow in age. | Reverse cream to brown to dark brown in center; with radial furrows. |
| Synthetic Agar | Good but thin | Lacking; no spores | Lacking | Vegetative mycelium light creamy-green; reverse colorless. |
| Nutrient Agar | Good | Poor; grayish | Lacking | Reverse cream to brown to black in center; rimose; with radial furrows. |
| Glucose Agar | Good | Poor; gray | Lacking | Reverse cream to brown to black in center; with radial furrows. |
| Pridham's Yeast Extract | Good | Good; light gray; no spores | Lacking | Reverse cream to yellow to brown in center; with radial furrows. |
| Gelatin | Moderate | Lacking | Lacking | Small zone of liquefaction. |
| Skimmed Milk | Good | Moderate; whitish; no spores. | Tan to brown | Coagulation and peptonization; colonies quite rimose. |
| Potato Plug | Good | Good; gray; no spores | Dark brown to black | Reverse cream to tan; surface nearly black; rimose. |
| Starch Plate | Poor | Scant; grayish | Yellow | Zone of hydrolysis moderate; reverse dark brown to black. |
| Cellulose Strip | No growth | | | |
| Dextrose-Nitrate Broth (inorganic). | Moderate | Lacking | Lacking | Nitrites detected. |
| Nitrate Broth (organic) | Good | Lacking | Lacking | Nitrates detected. |
| Calcium Malate Agar | Poor | Poor; grayish; no spores | Lacking | Reverse yellow green to dark olive; malate digested under and slightly beyond edge of colony. |
| Glycerol Calcium Malate Agar | Good | Good; gray; no spores | Light Brown | Reverse yellow to black; after three days of refrigeration reverse becomes greenish-black. Malate digested under colony. |
| Hickey & Tresner's Amidex Agar. | Good | Moderate; white to gray; no spores. | Lacking | Reverse cream to brown to dark brown in center but becoming yellow-green to brown after three days of refrigeration. Rimose and with radial furrows. |
| Gauze's Inorganic 1 Medium | Good | Moderate; gray; no spores | Yellow-brown | Reverse olive-green to black; surface with radial furrows. |
| Peptone Iron Agar | Moderate | | | No $H_2S$ produced. |

In connection with the description of this organism, it has been occasionally observed that there is a tendency for the colors imparted to some media to vary somewhat. This is especially pronounced after a number of transfers have occurred and the reasons for this are not clearly understood at this time. However, this variation in appearance does not have a marked effect on the ability of the organism to produce the antibiotic substances of the present invention.

This culture will grow on many media used for the propagation of Streptomycetes. A satisfactory medium is Pridham's yeast extract agar: A mixture of 4.0 g. of yeast extract, 10.0 g. of malt extract and 4.0 g. of dextrose in 1000 ml. of water is adjusted to pH 7.3 with sodium hydroxide, 20.0 g. of agar is added, the mixture is steamed for 15 to 20 minutes, dispensed, and then is sterilized for 15 minutes at 121 degrees C. The culture should be incubated at 28 degrees C.

It is to be understood that for the production of the antibiotic complex BA–180265(AB) according to the present invention, limitation to the aforesaid organism is not intended. It is especially desired and intended to include mutants produced from this organism by various means such as irradiation with X-rays or ultraviolet light, treatment with nitrogen mustards, and the like.

Antibiotic complex BA–180265(AB) and the aforesaid crystalline isolates BA–180265(A) and BA–180265(B) isolated therefrom, exhibit significant activity against a wide variety of microorganisms. However, they are particularly noteworthy in their action on Gram-positive organisms. While they demonstrate some activity against Gram-negative organisms, this activity is generally of somewhat lower level.

The following table illustrates the activity of crystalline isolate BA–180265(A) against a group of microorganisms which causes various diseases. Several of these microorganisms are resistant to other known antimicrobial agents. Particularly noteworthy is the activity of the present new antibiotic against the heretofore extremely resistant strain, *Micrococcus pyogenes* var. *aureus 400*.

These tests were run by seeding nutrient broth containing various concentrations of the pure antibiotics with the particular organism specified. The "minimum inhibitory concentration" (MIC) indicated in Table II is the minimum concentration of the respective antibiotic (in micrograms/milliliter) at which growth of the microorganism failed to occur.

Since the highest concentration employed was 100 mcg./ml. the "minimum inhibitory concentration" is not precisely stated where such concentrations apparently exceeded 100 mcg./ml. The test was conducted under standardized conditions.

TABLE II.—ANTIBACTERIAL ACTIVITY OF BA–180265(A) ISOLATES

| Microorganism: | MIC mcg./ml. |
|---|---|
| Gram-negative— | |
| Escherichia coli | >100 |
| Proteus vulgaris | >100 |
| Pseudomonas aeruginosa | >100 |
| Gram-positive— | |
| Streptococcus pyogenes | 0.045 |
| Diplococcus pneumoniae | 0.045 |
| Streptococcus faecalis | 0.19 |
| Micrococcus pyogenes var. aureus | 0.09 |
| Micrococcus pyogenes var. aureus 400 | 0.09 |
| Candida albicans | 0.19 |

The aforesaid crystalline isolates, BA–180265(A) and BA–180265(B), were also found to possess particularly pronounced activity against human carcinoma cells (strain Hela) grown in tissue culture according to the procedure described by Rightsel et al. (Journal of Immunology, vol. 76, pages 464–74, 1956). In this test the activity of said isolates is detected at levels as low as 0.005 to 0.01 mcg. per cc. At these concentrations there is extensive destruction of the tumor cells in vitro. In comparison the various actinomycins, such as actinomycins C and D, employed in the treatment of cancer in humans, exhibit activity at a range of 0.02 to 0.01 mcg. per cc. Thus, the activity against tumor cells exhibited by subject antibiotic isolates, BA–180265(A) and BA–180265(B) suggests their use in the treatment of human and animal cancers. Utility in cancer therapy has not as yet been demonstrated.

The present invention embraces the process for growing Streptomyces sp. (ATCC 14571), Isolate BA–180265, under controlled conditions to produce antibiotic complex BA–180265(AB). The culture is grown submerged in an aqueous nutrient medium containing a source of nitrogen, a carbohydrate and minerals. A satisfactory medium contains 10 g./l. of cerelose, 15 g./l. of soybean meal, 2.5 g./l. of distillers' solubles, 2.5 g./l. of sodium chloride, 5 g./l. of dipotassium phosphate, and 1 g./l. of calcium carbonate. The medium is adjusted to pH 7.0, the calcium carbonate is added and the broth sterilized. It is inoculated with 2–5 percent of a 40–60 hour old culture grown in the same medium. Fermentation is carried out at 26–30 degrees C. in 4 l. stirred glass jars and 150 gallon tanks, mechanically aerated, for from about 45 to about 65 hours. The progress of the fermentation is followed by standard plate assay methods using the activity of the broth against *B. subtilis*.

After a satisfactory level of antibiotic activity has been obtained, the active substances may be isolated by procedures well known to those skilled in the art. A particularly satisfactory procedure is outlined as follows: the beer is filtered with the aid of Hyflo Supercel, the broth is adjusted to pH 3–5 and is extracted with ⅓–½ volume of n-butanol. The solvent extract is concentrated to near dryness under reduced pressure, and the concentrate is extracted with several portions of ethyl acetate. The combined extracts are concentrated to near dryness.

To further purify and to resolve the crude concentrate of BA–180265(AB) into two components, the residue is subjected to countercurrent distribution in the system chloroform-ligroin-methanol-0.5 percent phosphate buffer. The antibiotic activity as determined against *B. subtilis* is found to concentrate at the two ends of the distribution apparatus with an area relatively free of activity in the center. Approximately 80 percent of the total activity resides in the chloroform-rich end and the rest of the activity resides in the methanol-rich end. The relatively non-polar antibiotic product designated BA–180265(A) is isolated by concentrating the aforesaid chloroform-rich fractions and the yellow microcrystalline product is isolated by filtration. The relatively polar antibiotic product designated BA–180265(B) is isolated by concentration of the aforesaid methanol end fractions, repeatedly extracting the concentrate with ethyl acetate and concentrating the said extract to near dryness.

Further purification of the yellow crystalline isolate BA–180265(A) can be accomplished by dissolving in chloroform in the presence of very dilute hydrochloric acid followed by passage through a column of silicic acid and cellulose powder (2:1). The antibiotic appears as a bright yellow band and can be eluted with a mixture of benzene and chloroform (1:3) or benzene and chloroform (1:1). The active fractions are concentrated and the crystalline material which separates is recrystallized from acetone.

Pure antibiotic BA–180265(A) crystallizes from acetone solution in the form of orange rectangular plates. It decomposes with softening at 265–268° C. It is soluble in benzene, chloroform, acetone, ethyl acetate and mixtures of chloroform and ethanol. With alcoholic ferric chloride, a characteristic dark green color is obtained; with concentrated nitric acid a purplish red color is obtained and, in concentrated sulfuric acid admixed with gallic acid, a deep green color is obtained. The compound BA–180265(A) does not form stable salts with acids or bases in aqueous solution. The optical rotation in chloroform solution of this new isolate is $[\alpha]_D$ —634°. BA–180265(A) exhibits a characteristic ultraviolet absorption spectrum with maxima at 253, 300 and 370 m$\mu$ with extinction co-efficients of 688, 273 and 460 respectively. When pressed into a pellet with potassium bromide a number of characteristic peaks appear in the infrared region, the more significant of which appear at the following frequencies expressed in reciprocal centimeters; 3450 strong, 2850 strong, 2700 strong, 1640 very strong, 1575 strong, 1525 medium, 1460 strong, 1340 medium, 1285 strong, 1265 very strong, 1210 medium, 1185 strong, 1125 medium, 1100 strong, 1085 strong, 1040 medium, 1030 medium, 1020 medium, 1005 strong, 995 strong (shoulder), 975 medium, 955 strong, 935 medium, 912 weak, 865 strong, 850 medium, 822 medium and 813 medium. The infrared absorption spectrum of BA–180265(A, crystallized from acetone) is shown in the accompanying drawing, FIG. 1.

BA–180265(A) has been analyzed and found to contain the following elements in the proportions by weight specified:

| | |
|---|---|
| Carbon | 61.66 |
| Hydrogen | 4.63 |
| Oxygen (by difference) | 28.38 |
| Nitrogen | 5.33 |

The methoxyl content determined by analysis is 5.67 percent by weight; it contains no sulfur. These data correspond to the approximate empirical formula $$C_{30}H_{28}O_{10}N_2$$

and an approximate empirical formula weight of 567.

This crystalline isolate when recrystallized from chloroform is obtained in the form of lemon yellow hexagonal prisms. While the two crystalline forms are mutually interconvertible by recrystallization from the respective solvents, the lemon yellow hexagonal form from chloroform has a different elemental analysis and a different infrared spectrum. The decomposition points and ultraviolet maxima are approximately the same for both forms. While the reason for the difference in characteristic properties between the two forms is not known with certainty, the compound contains chlorine and it is believed that there may be involved the formation of an adduct between the new product of this invention and chloroform.

The aforesaid material crystallized from chloroform has been analyzed and found to contain the following elements in the proportions by weight specified:

| | |
|---|---|
| Carbon | 57.84 |
| Hydrogen | 4.55 |
| Nitrogen | 4.78 |

The compound contains 5.12 percent by weight of methoxyl and 6.7 percent by weight of chlorine. It has an optical rotation $[\alpha]_D$ of —585° in chloroform solvent and when pressed into solid potassium bromide by conventional techniques, exhibits an infrared spectrum with a number of characteristic peaks, the more significant of which appear at the following frequencies expressed in reciprocal centimeters: 3450 medium, 2950 medium, 1640 strong, 1580 strong, 1525 medium, 1460 strong, 1430 strong, 1360 medium, 1280 strong, 1260 strong, 1210 medium, 1180 strong, 1100 medium, 1080 strong, 1005 strong, 955 strong, 875 medium, 855 medium, 818 strong and 750 strong and broad. The infrared absorption spectrum of this crystalline isolate of BA–180265 (A, from chloroform) is shown in the accompanying drawing, FIG. 2.

Further purification of the second antibiotic, designated BA–180265(B), isolated by concentration of the methanol-rich fractions in the countercurrent distribution process described hereinbefore can be accomplished by repeated extraction of the concentrate with ethyl acetate. The solvent extract is concentrated further and dissolved in a 1:1 mixture of chloroform and ethyl acetate. This solution is passed through a column of silicic acid and cellulose powder (2:1) whereupon the antibiotic appears as a reddish orange band. The antibiotic is obtained as a dark reddish-brown microcrystalline solid after elution of the column and concentration of the eluate to dryness.

The following examples are given by way of illustration and are not to be construed as a limitation of this invention, many variations of which are possible without departing from the spirit or scope thereof.

*Example I*

Approximately 10 liters of a fermentation medium having the following composition is prepared and the batch is adjusted to pH 7.

| | G./l. |
|---|---|
| Cerelose (dextrose hydrate) | 10 |
| Soybean meal | 15 |
| Distillers solubles | 2.5 |
| Sodium chloride | 2.5 |
| Dipotassium phosphate | 5 |
| Calcium carbonate | 1 |
| Tap water to volume. | |

The medium is then distributed to a number of 1—1. Erlenmeyer flasks each containing approximately 225 ml. of the medium, and the contents sterilized by autoclaving for 20 minutes at 15 lb. steam pressure (121° C.). The inoculum is prepared by transferring the growth of a slant of Streptomyces sp., ATCC No. 14571, to a portion of this medium and incubating for about 48 hours at 28 degrees C. on a rotary shaker. The main batch of medium is then inoculated with 5 percent by volume of the inoculum so prepared. The inoculated medium is incubated at 26–30 degrees C. with agitation and aeration at the rate of about one volume of air per volume of broth per minute. Progress of the fermentation is followed by testing samples of the broth against *B. subtilis* by the well-known agar plate disc method. After 65 hours a broth with high antibiotic activity is obtained and fermentation is halted.

*Example II*

The fermentation broth obtained as described in Example I is filtered with the aid of 3–5 percent Hyflo Supercel and the filtrate is extracted with a one-third volume of n-butanol. The solvent extract is concentrated under reduced pressure to remove most of the solvent and the resulting concentrate is extracted several times with equal volumes of ethyl acetate. Evaporation of the ethyl acetate under reduced pressure leaves the crystalline product complex BA–180265(AB). This material exhibits a high degree of activity against a variety of microorganisms and against human carcinoma cells (strain Hela) in tissue culture.

*Example III*

The product complex BA–180265(AB) is subjeced to countercurrent distribution in the system chloroform-ligroin-methanol-0.5 percent phosphate buffer, pH 7.0, in the ratio 3:1:3:1. The antibiotic activity as determined by *B. subtilis* assay distributes itself essentially at the two ends. The bulk of the activity (approximately 80 percent) remains toward the chloroform side and the rest toward the methanol end. The relatively non-polar product from the chloroform end is recovered by concentration and the yellow micro-crystalline solid is removed by filtration. The product, BA–180265(A) is about 75 percent pure at this stage and exhibits a high degree of activity against microorganisms and against human carcinoma cells (strain Hela) in tissue cultures.

For final purification, the compound is dissolved in chloroform by shaking in the presence of very dilute hydrochloric acid. The chloroform extract is concentrated and after solution in a mixture of equal volumes of chloroform and benzene, is put onto a column made up of silicic acid (Mallinckrodt 100 mesh) and cellulose powder (2:1). The antibiotic appears as a bright yellow band and, after elution from a mixture of chloroform and benzene (3:1), the active fractions are concentrated and the crystalline residue is recrystallized from an acetone. Antibiotic BA–180265(A) crystallizes from acetone in the form of orange rectangular plates which decompose with softening at 265–268° C. Elemental analysis shows 61.66% carbon, 4.63% hydrogen and 5.33% nitrogen. The methoxyl content is 5.67 percent by weight; no sulfur can be detected. Antibiotic BA–180265(A) shows a characteristic ultraviolet spectrum with maxima at 253, 300 and 370 m$\mu$ with $E_{1\,cm.}^{1\%}$ values of 688, 273, and 460 respectively. The optical rotation $[\alpha]_D$ for the compound is −634° in chloroform solution. The compound gives a dark green color with ferric chloride solution, a purplish red coloration to nitric acid, and a deep green color with a mixture of sulfuric and gallic acids. A characteristic infrared absorption spectrum is obtained for BA–180265-(A, from acetone) and is shown in the accompanying drawing, FIG. 1; characteristic absorption maxima are tabulated hereinbefore.

The crystalline isolate is alternatively crystallized from a small volume of chloroform. There is obtained lemon yellow hexagonal prisms which decompose with softening at 265–268° C. Elemental analysis shows 57.84 percent carbon, 4.55 percent hydrogen, 4.78 percent nitrogen, 5.12 percent methoxyl, and 6.7 percent chlorine. A characteristic infrared absorption spectrum is obtained for BA–180265(A, from chloroform) and is shown in the accompanying drawing, FIG. 2; characteristic absorption maxima are tabulated hereinbefore. This form is converted to the previously described material by recrystallization from acetone. It is reconverted to the form with the infrared spectrum shown in FIG. 2 by recrystallization from chloroform. An optical rotation, $[\alpha]_D$ of −585° is observed in chloroform solution.

The pure compound demonstrates a high degree of antibacterial activity as is shown hereinbefore. When tested against human uterine carcinoma cells (strain Hela) grown in tissue culture, this product causes extensive destruction of the tumor cells at levels of 0.005–0.05 mcg./ml.

*Example IV*

The relatively-polar active product from the methanol-rich fractions of the countercurrent distribution process of Example III is recovered by repeated extraction from the concentrate with ethyl acetate. The solvent extract is concentrated and put on a silicic acid-cellulose powder (2:1) column in a chloroform-ethyl acetate (1:1) mixed solvent. Antibiotic BA–180265(B) appears on the column as a reddish orange band, and after elution and concentration of the active fractions, is obtained as a dark reddish-brown microcrystalline solid. Antibiotic BA–180265(B) demonstrates a high degree of antibacterial activity and, when tested against human uterine carcinoma cells (strain Hela) grown in tissue culture, this product causes extensive destruction of the tumor cells at levels of 0.005–0.05 mcg./ml.

*Example V*

A 0.0001 percent solution of the crystalline antibiotic complex BA–180265(AB) isolated as described in Example II is aseptically prepared using isotonic saline as the vehicle. In a like manner 0.0001 percent solutions of pure crystalline antibiotic BA–180265(A) isolated as described in Example III and of pure crystalline antibiotic BA–180265(B) isolated as described in Example IV are prepared using isotonic saline as the vehicle.

*Example VI*

A fermentation broth, prepared as described in Example I, is aseptically filtered through a bacteriological filter and the sterile filtrate is dried from the frozen state. The dried residue, containing about 0.1% by weight of antibiotic complex BA–180265(AB), is a satisfactory composition.

What is claimed is:

1. A process for the production of a product containing an antibiotic complex which comprises cultivating Streptomyces sp. ATCC 14571 in an aqueous nutrient medium containing a carbohydrate and a source of organic nitrogen and inorganic salts under submerged aerobic conditions until substantial antimicrobial activity is imparted to said medium.

2. A process as claimed in claim 1 wherein the antibiotic complex is recovered from the fermentation broth.

3. A process for the production and recovery of an antibiotic complex and the separation of two antibiotic components thereof which comprises cultivating Streptomyces sp. ATCC 14571 in an aqueous nutrient medium under submerged aerobic conditions until substantial antibiotic activity is imparted to said medium, extracting the antibiotic complex therefrom with n-butanol, dissolving said complex in ethyl acetate, rendering said complex substantially free of solvent, subjecting said complex to countercurrent distribution in the system chloroform-ligroin-methanol-0.5 percent phosphate buffer pH 7.0 in the ratio 3:1:3:1 by volume and evaporating the terminal fractions of said countercurrent distribution to obtain respectively a relatively polar dark reddish-brown crystalline antibiotic substance and a relatively non-polar orange-yellow crystalline antibiotic substance.

4. An antibiotic product which in purified form crystallizes from acetone as orange rectangular plates which soften and decompose at 265–268° C.; which produces a dark green color with alcoholic ferric chloride, a purplish red color with concentrated nitric acid and a deep green color in admixture with concentrated sulfuric and gallic acids; which substance has substantially the following analysis: 61.7% carbon, 4.6% hydrogen, 5.3% nitrogen, oxygen (by difference) 28.4%, and a methoxyl content of 5.7%, ultraviolet absorption maxima at 253, 300 and 370 with $E_{1\,cm.}^{1\%}$ values of 688, 273, and 460 respectively, an optical rotation, $[\alpha]_D$ of −634° in chloroform solution, and which in solid form (KBr pellet) exhibits characteristic absorption in the infrared region of the spectrum at the following frequencies expressed in reciprocal centimeters: 3450 strong, 2850 strong, 2700 strong, 1640 very strong, 1575 strong, 1525 medium, 1460 strong, 1340 medium, 1285 strong, 1265 very strong, 1210 medium, 1185 strong, 1125 medium, 1100 strong, 1085 strong, 1040 medium, 1030 medium, 1020 medium, 1005 strong, 995 strong (shoulder), 976 medium, 955 strong, 935 medium, 912 weak, 865 strong, 850 medium, 822 medium and 813 medium; and which crystallizes from chloroform in the form of lemon yellow hexagonal prisms which soften and decompose at 265–268° C.; which substance has substantially the following analysis: 57.8% carbon, 4.6% hydrogen, and 4.8% nitrogen, a methoxyl content of about 5.1%, a chlorine content of about 6.7%, an optical rotation $[\alpha]_D$ of −585° in chloroform solution and which in solid form (KBr pellet) exhibits characteristic absorption in the infrared region of the spectrum at the following frequencies expressed in reciprocal centimeters: 3450 medium, 2950 medium, 1640 strong, 1580 strong, 1525 medium, 1460 strong, 1430 strong, 1360 medium, 1280 strong, 1260 strong, 1210 medium, 1180 strong, 1100 medium, 1080 strong, 1005 strong, 955 strong, 875 medium, 855 medium, 818 strong and 750 strong and broad.

5. The dark reddish-brown, relatively polar, crystalline antibiotic substance obtained by the separation process of claim 3.

6. A pharmaceutical composition comprising at least about 0.0001% by weight of a substance selected from the group consisting of the orange-yellow crystalline antibiotic claimed in claim 4, the dark reddish-brown crystalline antibiotic claimed in claim 5, and mixtures of these two in a non-toxic carrier.

7. A fermentation concentrate containing as its principal active ingredient the product claimed in claim 4.

No references cited.

SAM ROSEN, *Primary Examiner.*

J. D. GOLDBERG, *Assistant Examiner.*